(12) United States Patent
Danze

(10) Patent No.: US 8,864,152 B1
(45) Date of Patent: Oct. 21, 2014

(54) DECK ASSEMBLY FOR WHEELED VEHICLE

(71) Applicant: Marcelo Danze, Aliso Viejo, CA (US)

(72) Inventor: Marcelo Danze, Aliso Viejo, CA (US)

( * ) Notice: Subject to any disclaimer, the term of this patent is extended or adjusted under 35 U.S.C. 154(b) by 28 days.

(21) Appl. No.: 13/764,121

(22) Filed: Feb. 11, 2013

Related U.S. Application Data

(60) Provisional application No. 61/597,813, filed on Feb. 12, 2012.

(51) Int. Cl.
A63C 17/01 (2006.01)

(52) U.S. Cl.
CPC .................................. A63C 17/017 (2013.01)
USPC ............... 280/87.041; 280/87.042; 280/87.05

(58) Field of Classification Search
CPC ...... B62B 3/002; A63C 17/07; A63C 17/011; A63C 17/017; A63C 2203/06; A63C 2203/10; A63C 2203/42
USPC ............... 280/87.01, 87.021, 87.041, 87.042, 280/87.05
See application file for complete search history.

(56) References Cited

U.S. PATENT DOCUMENTS

| 4,155,565 | A | * | 5/1979 | de Caussin et al. | 280/87.042 |
|---|---|---|---|---|---|
| 4,165,089 | A | * | 8/1979 | Urdea et al. | 280/87.042 |
| 6,017,297 | A | * | 1/2000 | Collins | 482/146 |
| 6,375,208 | B1 | * | 4/2002 | Lee | 280/245 |
| 6,631,913 | B2 | * | 10/2003 | Godfrey | 280/87.05 |
| 7,070,193 | B2 | * | 7/2006 | Yamaguchi | 280/87.042 |
| 7,192,038 | B2 | * | 3/2007 | Tsai | 280/87.041 |
| 7,441,787 | B1 | * | 10/2008 | Jordan | 280/87.041 |
| 8,500,144 | B2 | * | 8/2013 | Querro et al. | 280/87.041 |
| 8,500,145 | B2 | * | 8/2013 | Chen | 280/87.042 |
| 8,613,457 | B2 | * | 12/2013 | Wegener | 280/87.041 |
| 2005/0230929 | A1 | * | 10/2005 | Chen | 280/87.05 |
| 2007/0035101 | A1 | * | 2/2007 | Gregory et al. | 280/87.042 |
| 2011/0031711 | A1 | * | 2/2011 | Grossman | 280/87.041 |
| 2011/0316246 | A1 | * | 12/2011 | Maratta | 280/28.5 |
| 2012/0068427 | A1 | * | 3/2012 | Alva | 280/87.05 |
| 2012/0193884 | A1 | * | 8/2012 | Scolari | 280/87.042 |

* cited by examiner

Primary Examiner — Katy M Ebner
(74) Attorney, Agent, or Firm — Vito A. Canuso, III; Plager Schack LLP

(57) ABSTRACT

A modular system applicable to a scooter or skateboard is provided comprising a deck, a plurality of rails, a first connector member configured to connect the rails to the deck at a spaced but secured position relative to the deck, a second connector member configured to connect the rails to the deck at a spaced but secured position relative to the deck, and a plurality of spacers configured to be positioned at one of several possible locations within the space defined by the rails and the deck.

5 Claims, 5 Drawing Sheets

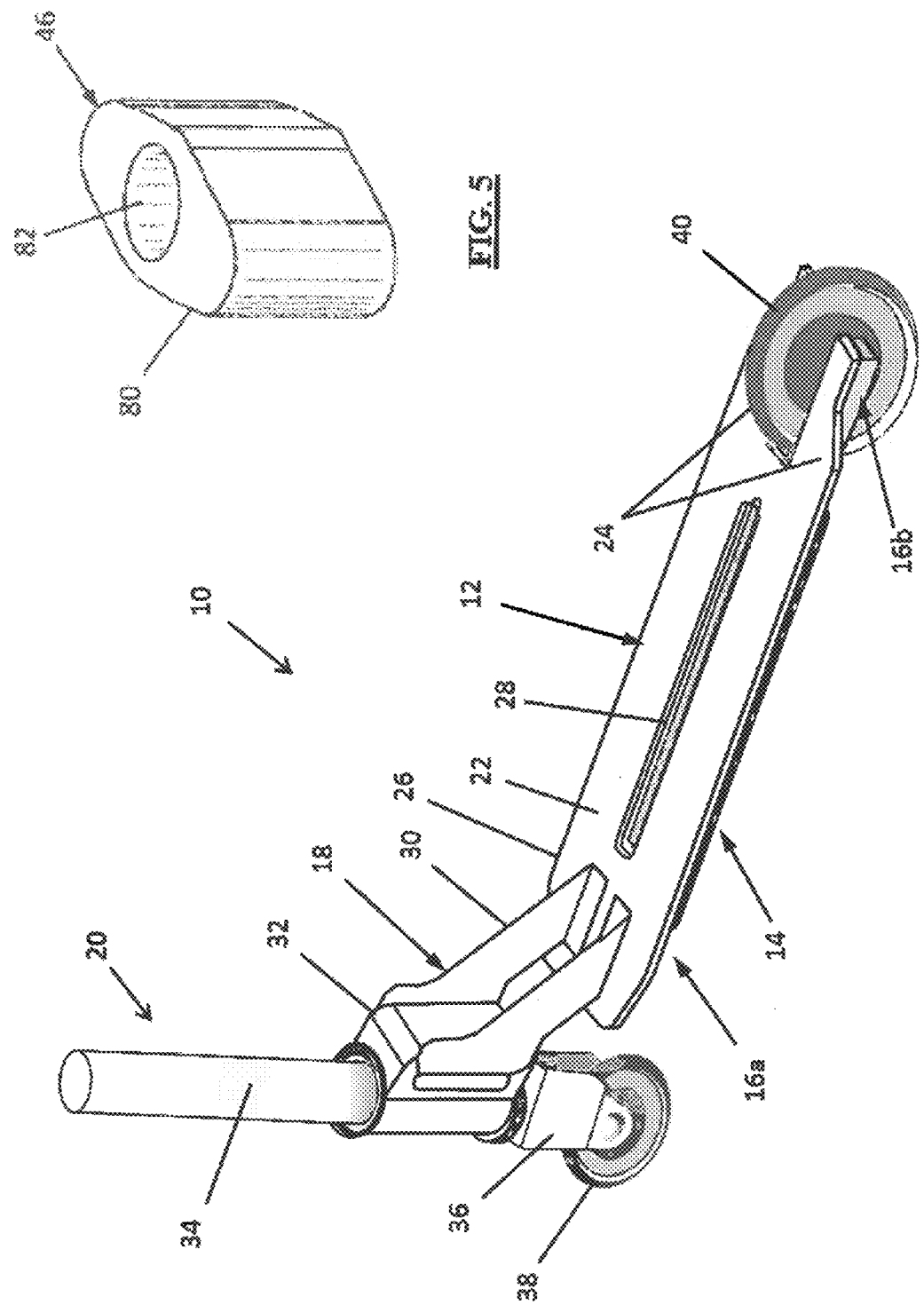

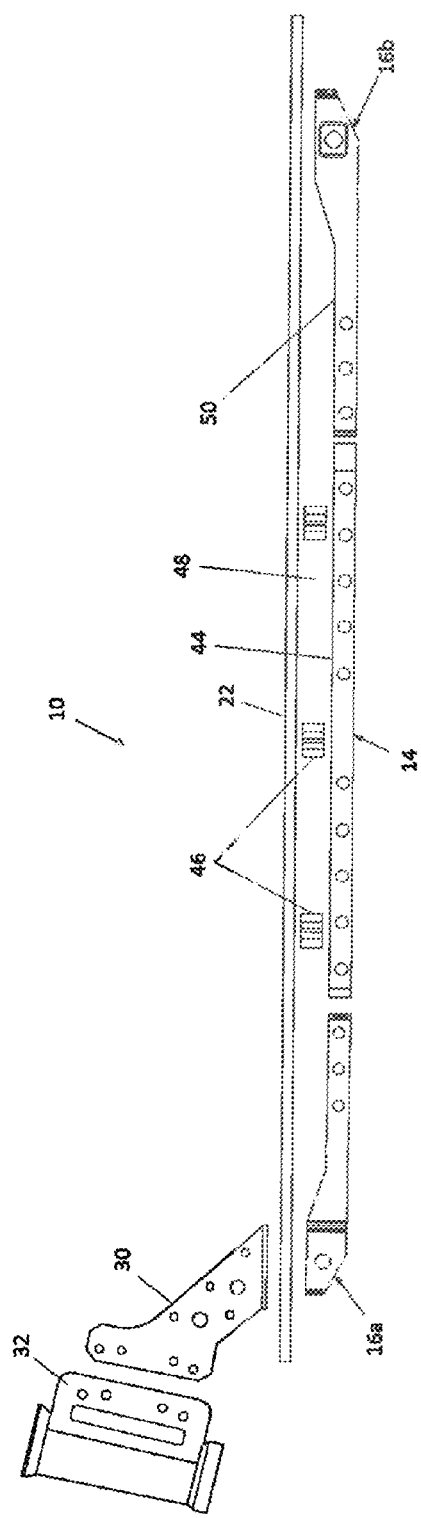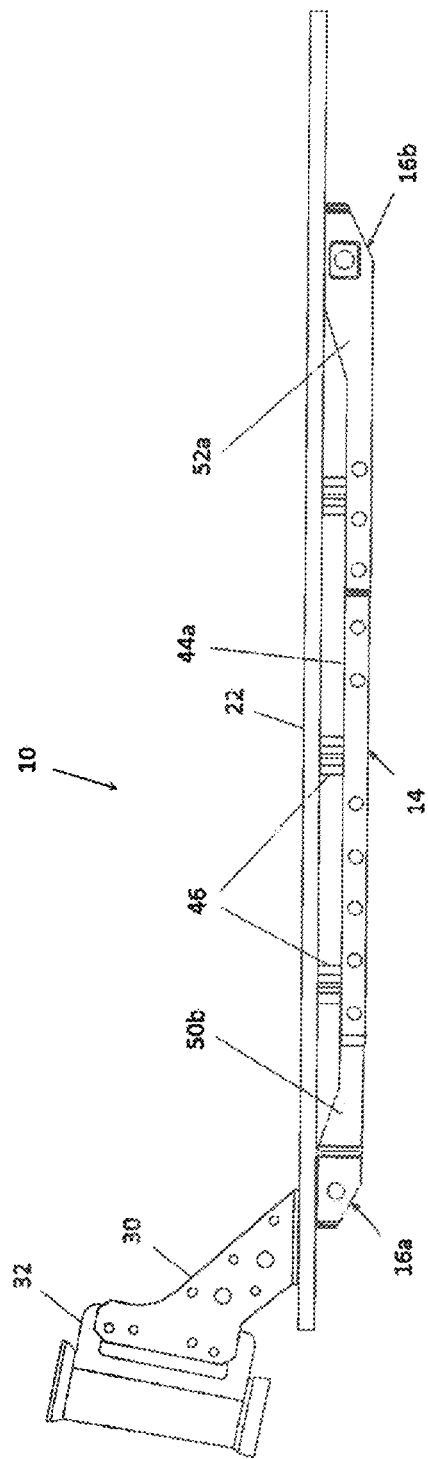

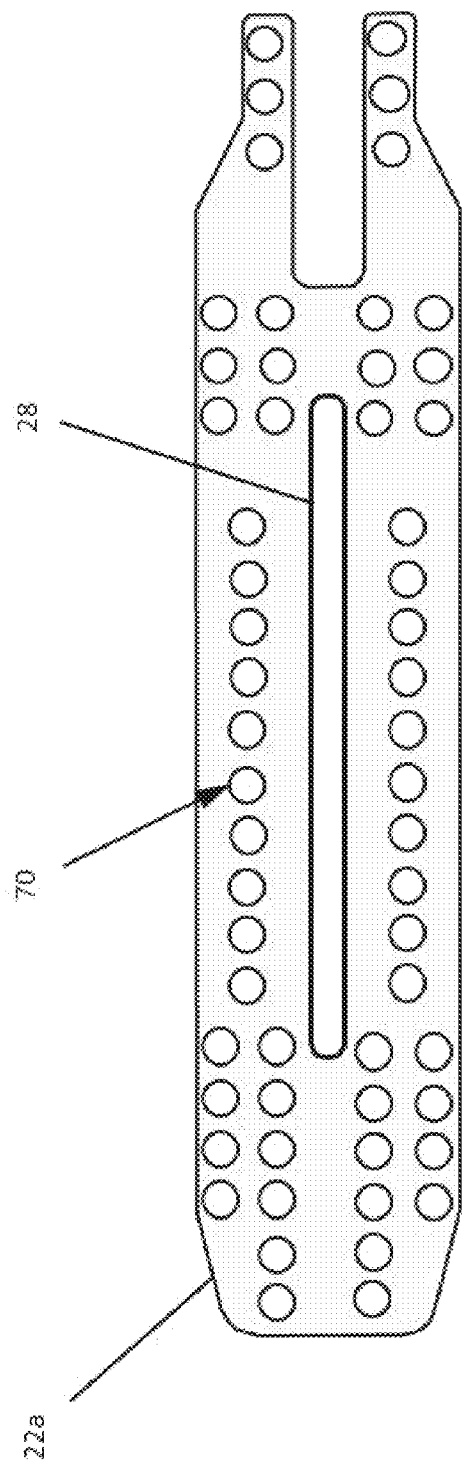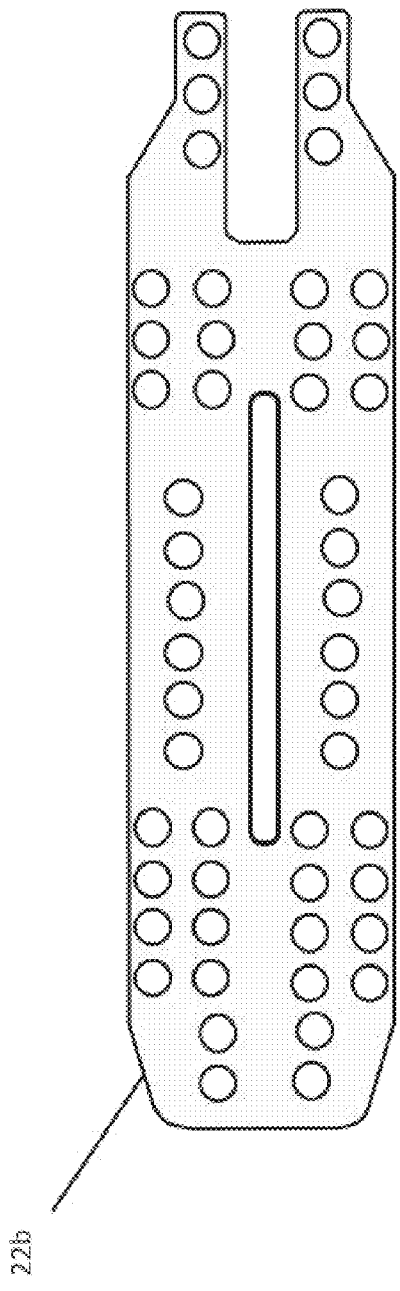
FIG. 4A
FIG. 4B

DECK ASSEMBLY FOR WHEELED VEHICLE

RELATED APPLICATIONS

This application claims priority to provisional patent application U.S. Ser. No. 61/597,813 filed on Feb. 12, 2012, the entire contents of which is herein incorporated by reference.

BACKGROUND

The embodiments herein relate generally to scooters and skateboards, including 2-wheeled scooters and skateboards, and more particularly to improvements that permit modular construction and adjustability to enable adaption to individual users particular size and needs, as well as easy replacement of modular components without need of replacing the entire scooter or skateboard.

SUMMARY

A modular system applicable to a scooter or skateboard is provided for permitting interchangeability and adjustability of the modular system components to enhance applicability of scooters or skateboards to multiple users and to permit replacement of worn components without need of replacing the entire scooter or skateboard. In one embodiment, the system comprises a deck comprising an outer profile suitable for use with a scooter or skateboard, the deck having a first end configured to be associated with the post and at least one front wheel of such scooter or skateboard, and a second end configured to be associated with at least one rear wheel of such scooter or skateboard, the deck comprising material sufficiently sturdy and rigid to permit a user to reliably and safely stand upon the deck while riding such scooter or skateboard, the deck comprising a plurality of holes permitting a plurality of positions to which corresponding system components may be attached to the deck, the deck further comprising a first user surface and a second opposite under surface for engagement with other system components.

The system also comprises a plurality of rails comprising a plurality of holes permitting a plurality of positions to which corresponding system components may be attached to the rails, along with first and second connector members to connect the rails to the deck at a spaced but secured position relative to the deck. In one embodiment, the first connector member is configured to connect a rail to the second surface of the deck proximate to the first end of the deck, and comprises a plurality of holes permitting a plurality of positions to which corresponding system components may be attached to the first connector member. Similarly, the second connector member is configured to connect a rail to the deck proximate to the second end of the deck, and also comprises a plurality of holes. Preferably, embodiments of the system comprise a plurality of spacers configured to be positioned at one of several possible locations within the space defined by the rails and the second surface of the deck when the rails are connected to the deck via the first and second connector members. Embodiments of the modular system further comprise a neck and a post support, each configured to be connected to each other, and the combination configure to be connected to the deck at a position proximate the first end of the deck.

In some embodiments, the second connector member is configured to support at least one rear wheel of such scooter or skateboard. In other embodiments, there are a plurality of first and second connector members, each set of first and second connector members configured to securely engage one of the plurality of rails to the deck. Preferably, the holes on the rails comprise a first set provided on a first rail surface in a first direction, and a second set provided on a second rail surface in a second direction. Similarly, preferably, holes on the first and second connector members comprise a first set provided on a first connector surface in a first direction, and a second set provided on a second connector surface in a second direction.

BRIEF DESCRIPTION OF THE FIGURES

The detailed description of some embodiments of the invention will be is made below with reference to the accompanying figures, wherein like numerals represent corresponding parts of the figures.

FIG. 1B shows a perspective schematic view of the embodiment of FIG. 1A as applied to a 2-wheeled scooter by example;

FIG. 2A shows an elevation exploded schematic view of the embodiment of FIG. 1A;

FIG. 2B shows an elevation schematic view of the embodiment of FIG. 2A joined together in partial assembly, with part 48 behind part 44 which is behind part 50;

FIG. 4A shows a top schematic view of one embodiment of the deck 22 of the modular system herein;

FIG. 4B shows a top schematic view of an alternative embodiment of the deck 22 of the modular system herein;

FIG. 5 shows a perspective schematic view of one embodiment of a spacer employed in embodiments of the modular system herein.

DETAILED DESCRIPTION OF CERTAIN EMBODIMENTS

An improved deck assembly is provided for a wheeled vehicle, including a scooter, skateboard or other such vehicle, whether motorized or not. The improved deck assembly provides modularity and user control over the amount of flexure. Such features provide a user with enhanced ability to tailor the vehicle to accommodate variable user weight, differing levels of comfort, response and control, differing riding styles, and ease of replacement of worn parts without need of replacing the entire vehicle.

The deck assembly comprises one of numerous possible configurations and/or shapes that, in the context of a scooter, permit adjustable position engagement at a first end with a handlebar post (that itself supports a front wheel), and that permit adjustable engagement with a rear wheel at a second opposite end of the deck assembly. In the context of a skateboard, the deck assembly would be configured and shaped to permit engagement directly with a front wheel at the first end, as no handlebar post would be applicable. The deck assembly further comprises one of numerous possible materials that balances stiffness, sturdiness, strength, durability and elasticity.

Figure 1A:
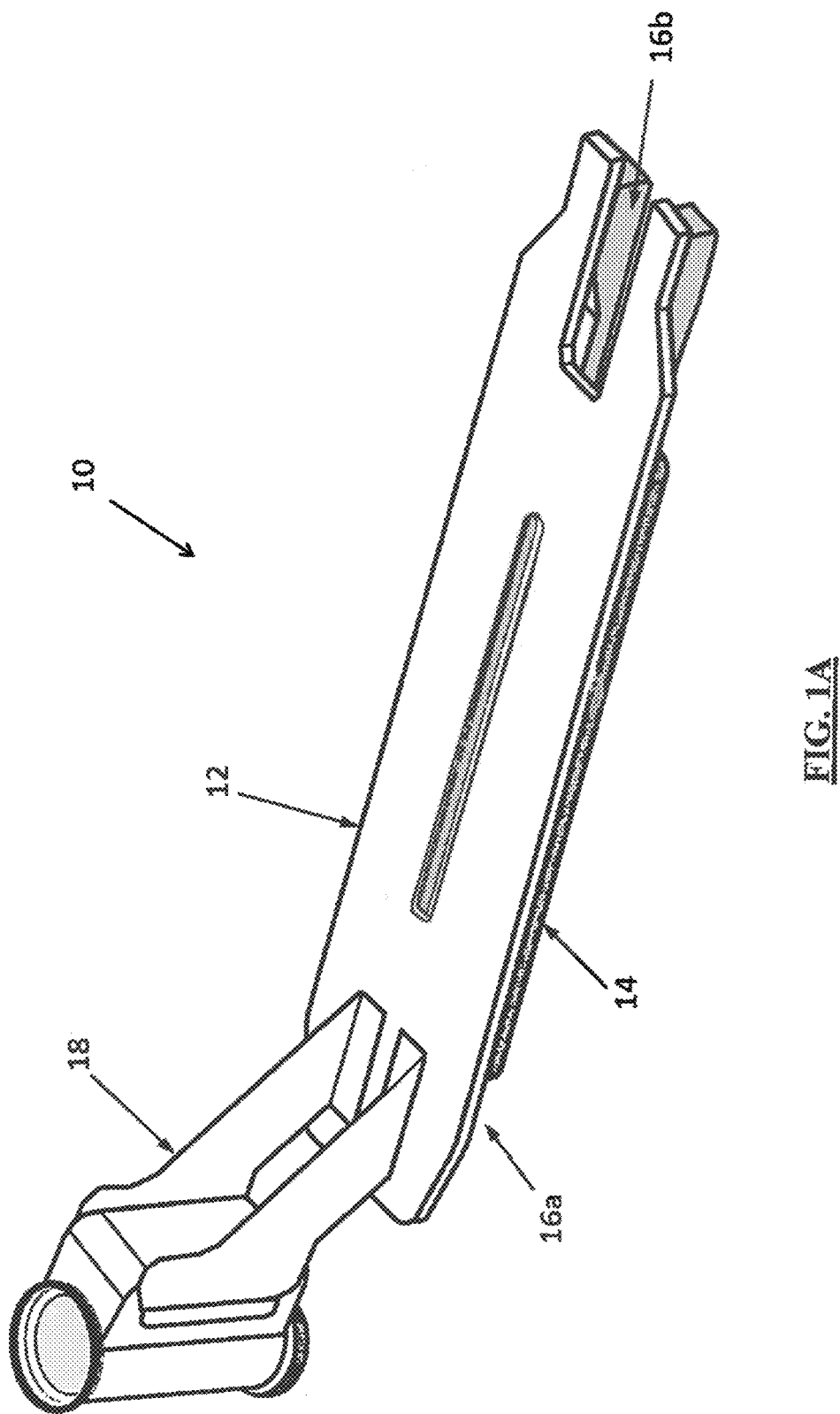
FIG. 1A shows a perspective schematic view of one embodiment of the present invention, which by example comprises a system of modular components compatible with a 2-wheeled scooter or skateboard.

With a scooter that comprises front and rear wheels, handlebars to steer and control vehicle motion, and a post for supporting the handlebars at a top end and the front wheel at a bottom end, a deck assembly may be applied. Referring to FIG. 1A, one embodiment of an improved modular system deck assembly 10 comprises a deck 12, a rail assembly 14, a first connector assembly 16a, a second connector assembly 16b, and a post connection assembly 18. In the context of one of several possible applications, the embodiment 10 may be applied to a 2-wheeled scooter 20, as shown in FIG. 1B, where the deck 12 comprises a deck plate 22 having a first end 26 toward a front wheel and post of the scooter 20 and a second end 24 toward a rear wheel of the scooter 20. If so desired, an elongate opening 28 may be also provided in deck plate 22. In one embodiment, such as the example illustrated, the second end 24 is configured to accept the rear wheel within a yoke-style arrangement, although the rear wheel need not be directly connected to the deck. Indeed, in the embodiment shown in FIG. 1B, the second end 24 of deck plate 22 is not directly connected to the rear wheel, but rather is configured with a channel into which the wheel may rotatably reside.

Continuing with reference still to FIG. 1B, the neck connection assembly 18 of embodiment 10 comprises a neck 30, a post support 32 for supporting a post 34 of scooter 20, a front wheel carriage 36 for supporting a front wheel 38, and the rear wheel 40. In this embodiment, the axle of the rear wheel 40 is preferably rotatably borne by the second connector assembly 16b, which in this embodiment functions in part as the rear wheel yoke. The handle of the scooter 20 is not shown, as it is not relevant to the invention described herein. The shape or configuration of the handle, or indeed even the existence of a handle, is not critical to embodiments of the present invention because they may be applied to a skateboard, with no post or handle.

Referring to FIGS. 2A and 2B, more details of embodiments of the present invention may be described. In that regard, by way of example, embodiment 10 comprises the deck plate 22, the rail assembly 14, the first and second connector assemblies 16a, 16b, and the neck 30 and post support 32. In one embodiment, the rail assembly 14 comprises a plurality of rails 44a and 44b (see FIG. 3), where preferably two rails are employed, although three or more may be used if so desired. The rails 44a and 44b are separated from the deck plate 22 by a plurality of spacers 46 within space 48. Although one configuration of spacer is shown in FIG. 5, numerous configurations are contemplated, both in girth and material, as the spacers can be employed to impact flexure and ride control of the riding device (e.g., scooter or skateboard). For example, for spacers made of a particular material, the addition of more spacers creates a stiffer deck plate, while the removal of some spacers increase the flexure of the deck plate. The longitudinal distance between spacers may be varied as well to impact the stiffness of the deck. As such, it is desirable that each of the components of embodiments of the present invention comprise a large number of holes to permit varied arrangement of spacers to be secured. The number of holes also impacts the overall weight of the system, particularly when the deck plate 22, the rail assembly 14, the first and second connector assemblies 16a, 16b, and the neck 30 are made of metal. Of course, each of these components may be made of other durable materials if so desired, including carbon fibers, composites, etc.

With regard to the spacers, the softer and/or more resilient the spacer material, the more cushioned the rider will feel through the deck, while a harder material will stiffen the feel. Some riders prefer a stiffer feel with the deck, and others prefer greater flexure and/or greater cushion. Thus, the spacers may be made from rubber or other similar resilient material for a spring-like effect (i.e., exhibiting a shock-absorbing characteristic), or can be made of stiffer material, such as polycarbonate or other materials having an increased hardness where less cushion is desired. To further aid in comfort, it is also contemplated that resilient pads may be inserted between engaging members of the deck assembly to absorb frictional forces normally transferred between members.

Figure 3:
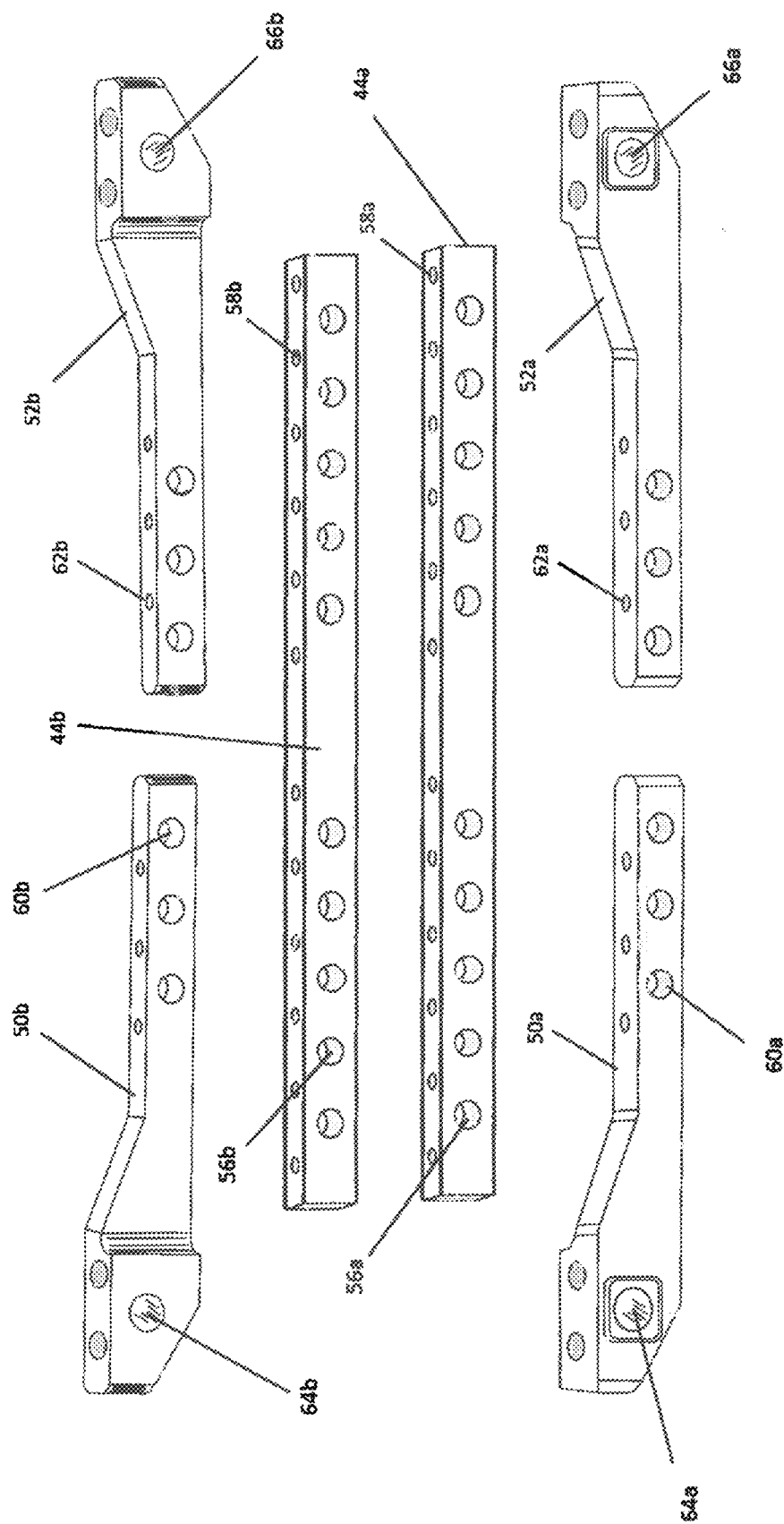
FIG. 3 shows a perspective exploded schematic view of the modular components 44a, 44b, 50a, 50b, 52a and 52b of the embodiment of FIGS. 2A and 2B.

As shown in FIGS. 2A and 2B, in some embodiments, the rails 44a, 44b are connected to the deck plate 22 via the first connector assembly 16a proximate the first end of the deck plate 22 and the second connector assembly 16b proximate the second end of the deck plate 22. With reference now to FIG. 3, details of the rail assembly 14, as well as the first and second connector assemblies 16a, 16b, may be described. In that regard, as discussed above, rail assembly 14 preferably comprises first and second rails 44a, 44b. For convenience of reference, the small letter "a" in the number shall designate the front set of components in FIG. 3 (relative to the reader), while the small letter "b" shall designated the back set of components. In that regard, rails 44a, 44b comprise, for example, elongate members having a first set of holes 56a, 56b through the sides of the rails, and a second set of holes 58a, 58b into the top of the rails.

The first connector assembly comprises brackets 50a and 50b, while the second connector assembly comprises brackets 52a and 52b. Notably, each of the brackets 50a, 50b, 52a, 52b comprise a first set of holes 60a, 60b through the sides of the brackets, and a second set of holes 62a, 62b into the top of the brackets. With such an arrangement, the rails 44a, 44b may be connected to connector brackets 50a, 52a, 50b, 52b using mechanical fasteners through the holes in the side walls of the components. Given that a plurality of such holes is preferable, the relative position of the rails to the connector brackets may be varied to lengthen or shorten the assembly. If so desired, holes 64a, 64b in first connector brackets 50a, 50b (and likewise holes 66a, 66b in second connector brackets 52a, 52b) may be provided to secure the two sets of brackets together, sandwiching the rails 44a, 44b therebetween. Preferably, although not necessarily, the connector brackets are fashioned so that when the rails and connectors are fully assembled, a space remains between the rails 44a, 44b.

Referring to FIGS. 4A and 4B, two different embodiments of deck plates 22a and 22b are shown, each comprising a plurality of holes 70 and elongate opening 28, with one embodiment of deck plate 22b being shorter than the other embodiment of deck plate 22a. It is contemplated that the length of the deck plate, the overall profile of the deck plate, the employment of an elongate opening 28, and the number of holes 70, are all optional and may be varied depending upon the range of variability in assembly of modular components desired by the manufacturer and/or the consuming public. As note above, the number of holes impacts the weight of the deck plate, but they also impact the flexure of the deck plate as well. Importantly, however, the number and placement of holes allows for varied placement of the first and second connector brackets and the number and placement of spacers. The holes proximate the first end of the deck plate also accommodate connection of the neck and post assembly to the deck. Preferably, the holes provided on the top surfaces of the rails and connector brackets are threaded to accommodate a mechanical fastener to connect the deck to the rails (through the spacers) and to the first and second connectors, at desired locations.

With such an arrangement of modular components in the embodiments described herein and variations thereof, it is contemplated that the elongate rails would take the brunt of the forces normally applied to the undercarriage of a scooter or skateboard during vehicle use, rather than the deck plate itself. It is advantageously more economic to replace worn rails than to replace worn deck plates.

In some embodiments, the neck bracket and post support (or collar)—where embodiments of the invention are applied to a scooter, for example—may be made as discrete pieces or as a unitary piece. The neck may comprise one of any number of configurations and shapes that function to ensure reliable connection to the post at one end and the deck plate and rails at the other end. Persons of ordinary skill in the art may appreciate that numerous design configurations may be possible to enjoy the functional benefits of the inventive systems. Thus, the scope of the invention is reflected by the breadth of the claims below rather than narrowed by the embodiments described above.

What is claimed is:

1. A modular system applicable to a scooter or skateboard for permitting interchangeability and adjustability of the modular system components, the system comprising:
    a deck comprising an outer profile, the deck having a first end configured to be associated with a post and at least one front wheel, and a second end configured to be associated with at least one rear wheel, the deck comprising material sufficiently sturdy and rigid to permit a user to reliably and safely stand upon the deck while riding, the deck comprising a plurality of holes, the deck further comprising a first user surface and a second opposite under surface;
    first and second rails each comprising a plurality of holes;
    a first connector member configured to connect a first end of the first rail to the second surface of the deck proximate to the first end of the deck, the first connector member configured to connect the first rail at a spaced but secured position relative to the deck, the first connector member comprising a plurality of holes;
    a second connector member configured to connect a second end of the first rail to the second surface of the deck proximate to the second end of the deck, the second connector member configured to connect the first rail at a spaced but secured position relative to the deck, the second connector member comprising a plurality of holes;
    a third connector member configured to connect a first end of the second rail to the second surface of the deck proximate to the first end of the deck, the first connector member configured to connect the second rail at a spaced but secured position relative to the deck, the first connector member comprising a plurality of holes;
    a fourth connector member configured to connect a second end of the second rail to the second surface of the deck proximate to the second end of the deck, the second connector member configured to connect the second rail at a spaced but secured position relative to the deck, the second connector member comprising a plurality of holes; and
    a plurality of spacers configured to be positioned at one of several possible locations within the space defined by the rails and the second surface of the deck when the rails are connected to the deck via the connector members;
    whereby the plurality of holes on the deck, rails and connector members provides a plurality of positions to which the rails may be connected to the deck.

2. The modular system of claim 1, wherein the second and fourth connector members are configured to support at least one rear wheel of such scooter or skateboard.

3. The modular system of claim 1, wherein the holes on the rails comprise a first set provided on a first rail surface in a first direction, and a second set provided on a second rail surface in a second direction.

4. The modular system of claim 1, wherein the holes on the first and second connector members comprise a first set provided on a first connector surface in a first direction, and a second set provided on a second connector surface in a second direction.

5. The modular system of claim 1, further comprising a neck and a post support, each configured to be connected to each other, and the combination configured to be connected to the deck at a position proximate the first end of the deck.

* * * * *